July 7, 1959 — T. H. HOLMES — 2,893,757
PIPE COUPLING WITH SEAL WELD CUTTER MEANS
Filed July 2, 1957

INVENTOR
TRENT H. HOLMES
BY
ATTORNEY

United States Patent Office 2,893,757
Patented July 7, 1959

2,893,757

PIPE COUPLING WITH SEAL WELD CUTTER MEANS

Trent H. Holmes, Rocky Hill, Conn., assignor to United Aircraft Corporation, East Hartford, Conn., a corporation of Delaware Application July 2, 1957, Serial No. 669,661

8 Claims. (Cl. 285—21)

This invention relates to improved means for mounting control rod mechanisms, pumps, and other accessories to a reactor which are of the type requiring a seal weld and, particularly, to means which will permit the quick and remote removal of such an accessory.

When a seal weld is made between two sections of an assembly of this type, a coupling nut is also provided as a structural supporting means for the sections. The weld is relied upon only to provide a fluid type seal at the joint between the sections.

It is an object of this invention to provide a seal weld cutter which will remotely and automatically cut a seal weld between two sections of an assembly when the coupling nut of the assembly is removed.

Another object of the invention is to provide a quick disconnect for an assembly of this type in which the coupling nut carries the seal cutter and the coupling nut thread forms the lead screw for controlling the cutting action of the cutter.

A further object of this invention is to provide means for mounting the cutter and the coupling nut so that the cutter will ride over the weld without doing any cutting during tightening of the nut but will automatically cut the weld during removal of the nut.

These and other objects of the invention will be evident or will be pointed out in connection with the detailed description of one embodiment of the invention shown for purposes of illustration in the accompanying drawing.

Figure 1:
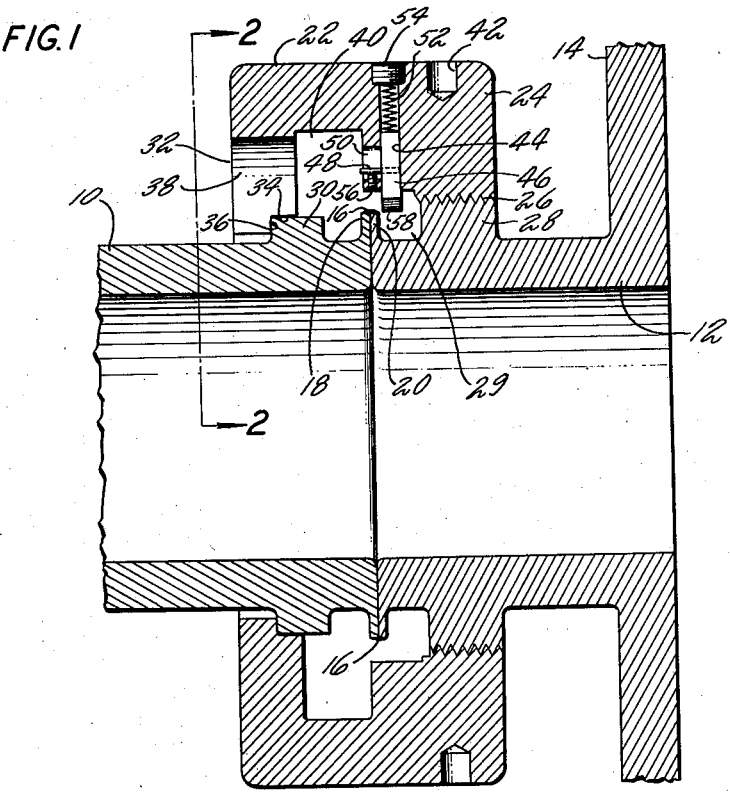
Figure 2:
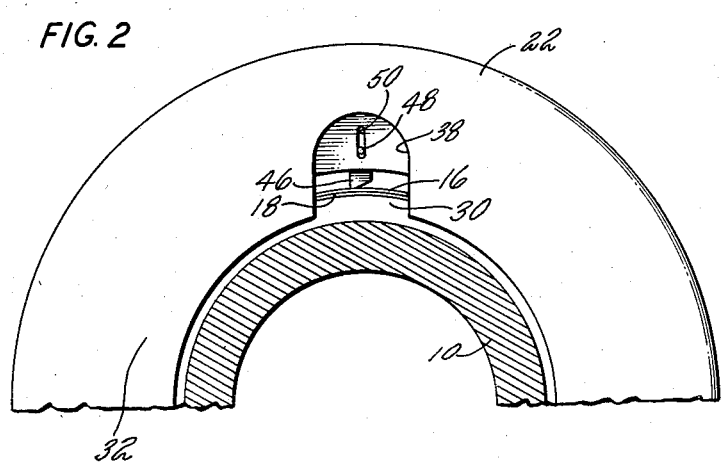

In this drawing, Fig. 1 is a longitudinal sectional view through a pipe assembly embodying the invention. Fig. 2 is a section taken on line 2—2 of Fig. 1.

For purposes of illustrating the invention, two sections, 10 and 12, of a pipe or hollow rod assembly have been shown. Pipe section 12 may be in the form of a base flange or annular boss, formed integral with reactor casing 14 to which the pipe section 10 is secured in a fluid-tight manner by an annular seal weld 16. The pipe section 10 may be part of a pump or other accessory to the reactor. For ease in making the seal weld, the abutting ends of pipe sections 10 and 12 are formed with annular outstanding flanges, or lips, 18 and 20 respectively, on the outer periphery of which the weld 16 is made. This weld is provided solely for sealing purposes and is not intended to form the structural connection between the pipe sections.

For the purpose of structurally connecting the pipe sections, the coupling, or connecting, nut 22 is provided, which is carried by section 10 and has an annular flange 24 which makes threaded engagement at 26 with an annular flange 28 formed integral with pipe section 12. Flange 28 is located a short distance back of lip 20 and with the latter forms an annular recess 29.

Coupling nut 22 is supported on pipe section 10 by an annular flange 30, formed integral with the latter. Flange 30 is engaged by an annular inwardly directed flange 32 on the nut which is guided for rotation by its engagement with flange 30. Referring to Fig. 1, it will be noted that flange 32 has an annular rectangular recess which receives the annular flange 30 loosely therein. The recess includes an annular surface 34 which engages the outer periphery of flange 30 and an annular radial surface 36 which engages the adjacent face of flange 30 remote from the end of the pipe and provides an abutment against which the coupling nut 22 rests as the pipe sections are drawn together by the nut. Flange 32 is provided with a radial slot 38 in its inner periphery for purposes hereinafter to be described.

The threaded flange 24 and the mounting flange 32 of the coupling nut are spaced apart by an annular chamber 40. Of the two flanges, flange 24 is the thicker and is provided with a plurality of radial spanner wrench holes 42 by which the nut can be rotated from a safe distance. It will be obvious that other mechanical devices may be used for driving the nut, such as a gear or chain and sprocket drive, as desired. Just back of the threaded portion of flange 24, the nut is provided with a broached hole 44 which may be rectangular in cross section and of a suitable size to receive a cutter bit 46 which conforms in cross section to the section of the hole. One end of the cutter bit 46 extends into recess 29. The cutter bit is free for longitudinal movement in the hole 44 but is limited in this movement by engagement of a pin 48 carried by the bit with the ends of a closed slot 50 formed in flange 24 between the hole 44 and chamber 40. A spring 52 is provided in passage 44 above the cutter bit 46 and is held in compression against the cutter bit by a threaded plug 54 which is threaded into a counterbore in the upper end of passage 44. The cutter bit 46 is constantly biased inwardly into the position shown in Fig. 1 in which the pin 48 engages the inner end of slot 50. The effective length of slot 50 can be varied by an adjusting screw 56 which is threaded into flange 24 directly beneath the inner end of slot 50 and projects into the slot in position to engage pin 48.

As shown herein, the threaded connection 26 between the coupling nut and flange 28 is a right-hand thread and the cutter bit 46 has an inclined lower end which provides clearance for a horizontal cutting edge 58.

In assembling the cutter bit in the nut a bit is first inserted in the passage 44 and the pin 48 is threaded into the cutter bit, access being gained through the slot 38 in flange 32. Also, the adjusting screw 56 is threaded into the flange 24 to engage the pin when it is in the desired position in the bottom of the slot. The spring 52 is then inserted in the passage 44 and is compressed by turning the threaded plug 40 into the counterbore. The assembly up to this point can be made before the nut is threaded over the pipe section 10. As the threaded flange 24 is turned in a clockwise direction onto the threaded flange 28, the shoulder provided by surface 36 will ultimately abut the annular flange 30 and provide the structural support for holding the two sections 10 and 12 firmly together. During the threading-on movement of the nut 22, the cutter bit will pass over the welded lips 18 and 20, but since the engagement of the cutter bit with the weld 16 is by the inclined end surface of the cutter bit, the latter will merely move radially outwardly in its passage 44 against the action of spring 52 and the cutter bit will move over the weld 16 without doing any cutting.

When the nut is removed, however, the rotation of this nut in a counterclockwise direction, as viewed in Fig. 2, will cause the horizontal cutting edge 58 to engage and progressively cut off the weld 16, as the nut 22 is rotated on the threaded connection 26. It will be noted that the threaded connection 26 acts as a cutter lead screw as the nut is being removed. During this cutting movement, the cutter bit 46 is held in the lower extremity of the slot 50 by spring 52 in position to remove the weld.

It will be evident that as a result of this invention the pipe section 10 can be automatically disconnected from pipe section 12 by removing the nut 22. During the rotation of the coupling nut the cutter bit moves across the face of the weld and automatically removes the seal weld as the pipe sections are uncoupled. It will also be evident that this seal weld cutting can be performed from a safe distance by remotely controlled actuating means, so that the assembly is adapted for use in connection with reactors where radio-active liquid metal or the like may be present.

While only one embodiment of the invention has been illustrated and described herein, for the purpose of disclosing the invention, it will be understood that the invention is not limited to the particular application illustrated herein and that the coupling nut and cutter may be used with different welded assemblies without exceeding the scope of the invention.

I claim:

1. In combination, a disconnectible assembly including two sections, a seal weld joining said sections, means providing a structural connection between said sections including a rotatable connecting member having threaded engagement with one of said sections and having abutting engagement with the other of said sections, and means carried by said connecting member which is operative only when the latter is rotated in a direction to disconnect said sections for automatically cutting said weld.

2. In combination, a disconnectible assembly including two sections, a seal weld joining said sections, means providing a structural connection between said sections including a rotatable connecting member having threaded engagement with one of said sections and having abutting engagement with the other of said sections, a cutting member carried by said connecting member which is mounted for reciprocating movement toward and from said weld and having an inclined surface at its inner end terminating in a cutting edge, and means for biasing said cutting member constantly into cutting position relative to said weld upon rotation of said connecting member in a direction to disconnect said assembly.

3. In combination, a disconnectible assembly including two sections, a seal weld joining said sections, means providing a structural connection between said sections including a rotatable connecting member having threaded engagement with one of said sections and having abutting engagement with the other of said sections, a cutting member carried by said connecting member which is mounted for reciprocating movement toward and from said weld and having an inclined surface at its inner end terminating in a cutting edge, means for biasing said cutting member constantly into cutting position relative to said weld upon rotation of said connecting member in a direction to disconnect said assembly, and adjustable stop means for varying the position of said cutting edge relative to said weld.

4. In combination, a disconnectible assembly including two pipe sections having abutting annular lips at their adjacent ends, an annular weld at the peripheries of said lips forming a fluid tight seal between said sections, a coupling nut having threaded engagement with one of said sections and having abutting engagement with the other of said sections for structurally connecting said sections, an elongated cutter bit carried by said nut which is freely reciprocable in a passage in said nut, said bit having an inclined inner end adjacent said weld terminating in a cutting edge, means for biasing said bit into a position to engage and progressively remove said weld as said nut is rotated to disconnect said pipe sections, and adjustable stop means for limiting the movement of said bit relative to said weld.

5. In combination, a disconnectible assembly including two pipe sections having abutting annular lips at their adjacent ends, an annular weld at the peripheries of said lips forming a fluid tight seal between said pipe sections, a coupling nut including an inturned threaded flange at one end having threaded engagement with one of said pipe sections and having an inturned flange at its other end which engages behind an outturned flange on the other of said pipe sections for drawing said sections together, said nut having a passage therein terminating adjacent said weld, a cutter bit reciprocable in said passage having an inclined inner end adjacent said weld terminating in a cutting edge, stop means for adjustably positioning said bit in said passage, and means for constantly biasing said bit inwardly against said stop means into a position to cut said weld as said nut is rotated to disconnect said assembly.

6. In combination, a disconnectible assembly including two tubular sections having annular lips at their adjacent ends, said sections also having annular outstanding flanges spaced from said lips, an annular weld at the peripheries of said lips forming a fluid tight seal between said sections, a coupling nut including an inturned annular flange at one of its ends having threaded engagement with the flange on one of said sections and having an inturned flange at its other end which makes abutting engagement behind the flange on the other of said sections, said nut having a passage therein terminating adjacent said weld, a cutter bit reciprocable in said passage having an inclined end adjacent said weld terminating in a cutting edge, adjustable abutment means for normally positioning said cutter bit relative to said weld, spring means biasing said cutter bit against said abutment means, said cutter bit being so positioned relative to said weld by said abutment means that its inclined end rides over said weld as said nut is rotated to connect said sections together but said cutting edge progressively cuts said weld as said nut is rotated to disconnect said assembly.

7. In combination, a disconnectible assembly including two tubular sections having annular lips at their adjacent extremities, each of said sections also having an outstanding annular flange spaced from the lip at its extremity, an annular weld at the periphery of said lips forming a fluid tight seal between said sections, a coupling nut including an annular inwardly directed flange at one of its ends having threaded engagement with the outstanding flange of one of said sections and including a second annular inwardly directed flange near its opposite end which makes abutting engagement with the outstanding flange of said other section, said flanges on said nut forming between them an annular recess, a substantially radial passage in said nut communicating with said recess, a cutter bit longitudinally reciprocable in said passage having an inclined end terminating in said recess in a cutting edge, an adjustable stop carried by said nut and engageable by said cutter bit for locating the cutting edge of the latter relative to said weld, and spring means constantly biasing said cutter bit against said stop into a position to progressively cut said weld as said nut is rotated to disconnect said assembly.

8. In combination, a disconnectible assembly including two tubular sections having annular lips at their adjacent extremities, each of said sections also having an outstanding annular flange spaced from the lip at its extremity, an annular weld at the periphery of said lips forming a fluid tight seal between said sections, a coupling nut including an annular inwardly directed flange at one of its ends having threaded engagement with the outstanding flange of one of said sections and including a second annular inwardly directed flange near its opposite end which makes abutting engagement with the outstanding flange of said other section, said flanges on said nut forming between them an annular recess, said second flange having a peripheral portion cut away giving access to said recess, a substantially radial passage in said nut communicating with said recess, a cutter bit longitudinally reciprocable in said passage having an inclined end terminating in said recess in a cutting edge, an slot in the sidewall of said passage facing said second flange, a pin carried by said cutter bit and located in said slot, adjustable stop means for varying the length of said slot, and spring means for constantly biasing said cutter bit into a position to progressively cut said weld as said nut is rotated to disengage said assembly, said cutter bit being so positioned that during rotation of the latter to connect said sections said inclined end rides over said weld without cutting the latter.

References Cited in the file of this patent
UNITED STATES PATENTS

| | | |
|---|---|---|
| 1,825,062 | Heaton et al. | Sept. 29, 1931 |
| 2,677,459 | Ritzenberg | May 4, 1954 |
| 2,796,792 | Dias | June 25, 1957 |